(12) United States Patent
Leifer

(10) Patent No.: US 6,459,171 B1
(45) Date of Patent: Oct. 1, 2002

(54) METHOD AND APPARATUS FOR SHARING POWER

(75) Inventor: Mark C Leifer, Fremont, CA (US)

(73) Assignee: Arraycomm, Inc., San Jose, CA (US)

(*) Notice: Subject to any disclaimer, the term of this patent is extended or adjusted under 35 U.S.C. 154(b) by 68 days.

(21) Appl. No.: 09/620,949

(22) Filed: Jul. 21, 2000

(51) Int. Cl.[7] .................................................. H02J 4/00
(52) U.S. Cl. .............................. 307/52; 307/24; 307/29
(58) Field of Search ................................. 307/18, 23, 24, 307/25–29, 52–63, 19–21

(56) References Cited

U.S. PATENT DOCUMENTS

| | | | | |
|---|---|---|---|---|
| 4,194,147 A | * | 3/1980 | Payne et al. | 307/53 |
| 4,618,779 A | * | 10/1986 | Wiscombe | 307/60 |
| 4,729,086 A | * | 3/1988 | Lethellier | 307/53 |
| 4,866,295 A | * | 9/1989 | Leventis et al. | 307/53 |
| 5,157,269 A | * | 10/1992 | Jordan et al. | 307/59 |
| 5,200,643 A | * | 4/1993 | Brown | 307/53 |
| 5,266,838 A | * | 11/1993 | Gerner | 307/29 |
| 5,428,524 A | * | 6/1995 | Massie | 307/53 |
| 5,672,958 A | * | 9/1997 | Brown et al. | 307/53 |
| 5,949,153 A | * | 9/1999 | Tison et al. | 307/29 |
| 6,150,803 A | * | 11/2000 | Varga | 307/60 |

* cited by examiner

*Primary Examiner*—Fritz Fleming
(74) *Attorney, Agent, or Firm*—Blakely Sokoloff Taylor & Zafman LLP

(57) ABSTRACT

A power sharing apparatus and method. In one embodiment, a method of sharing power includes switchably coupling and decoupling each of a plurality of power sources to deliver at least a portion of power to a shared power supply. Each of the power sources corresponds to one of a plurality of applications. The method also includes adjusting the portion of power delivered by each one of the power sources to the shared power supply responsive to an amount of usage by the application corresponding to the respective power source.

25 Claims, 7 Drawing Sheets

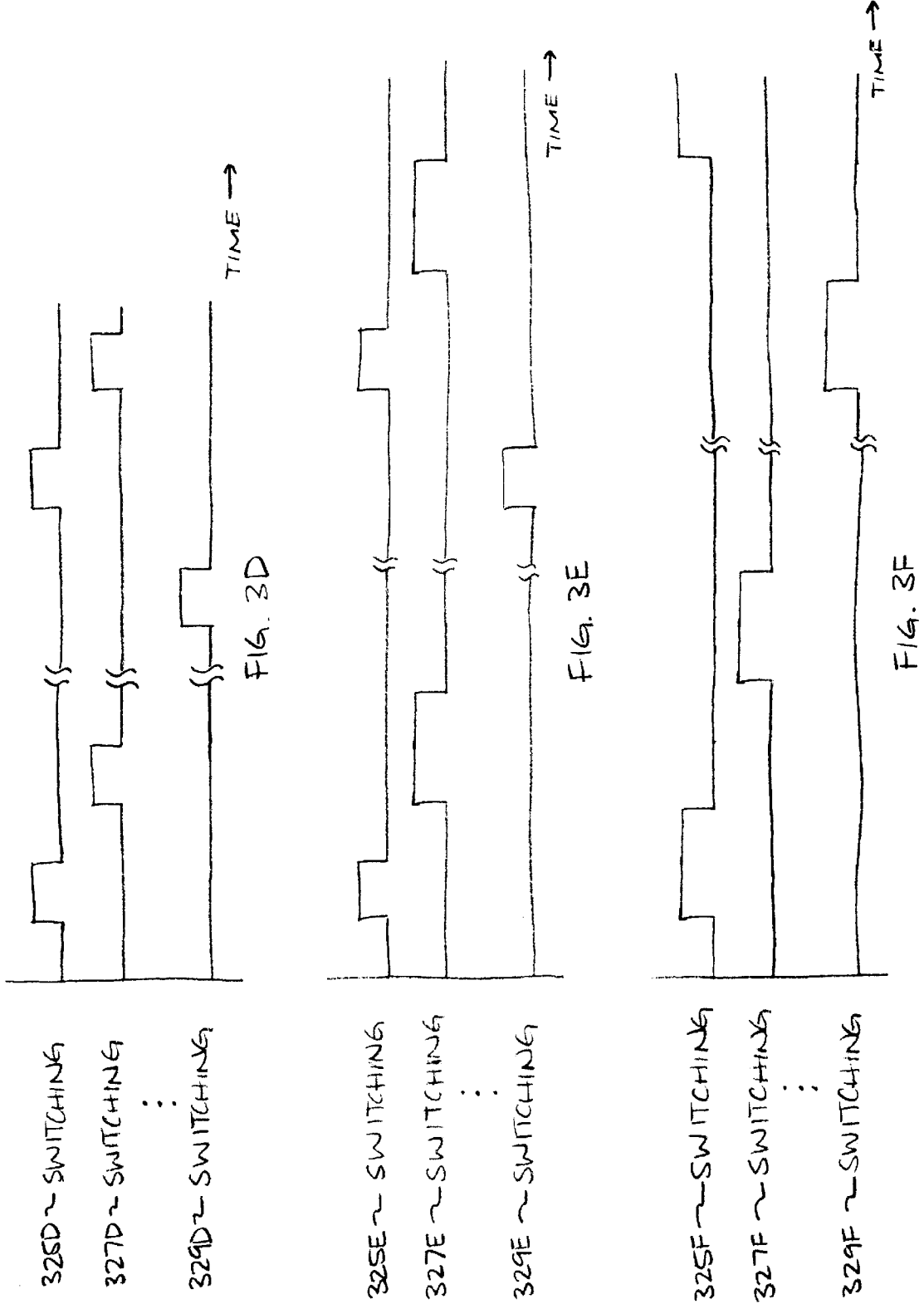

METHOD AND APPARATUS FOR SHARING POWER

BACKGROUND OF THE INVENTION

1. Field of the Invention

The present invention relates generally to power supplies and, more specifically, the present invention relates to power supplies drawing power from a plurality of sources.

2. Background Information

Loads may be required in certain applications to draw power from a plurality of power sources. FIG. 1A is an example of such a present day situation. As shown, a load 101 is operating from redundant power sources including primary power source 103 and secondary power source 105. An example of the situation illustrated in FIG. 1A might be a satellite system operating from redundant power sources including a primary power source and at least one backup power source. If primary power source 103 fails, secondary power source 105 is switched to supply power to load 101. In some situations, multiple secondary power sources 105 may be available for backup.

FIG. 1B is a diagram of another present day situation in which multiple applications may share a device. For example, multiple tenants may share one of a plurality of common apartment building utility devices. As shown in FIG. 1B, applications 159, 161 and 163 share device 151. In the example shown in FIG. 1B, power source 153 is associated with application 159, power source 155 is associated with application 161 and power source 157 is associated with application 163. Shared device 151 is powered by a single power source 155. Thus, in this situation, even though applications 159, 161 and 163 all utilize shared device 151, only one power source 155 is needed to supply power to shared device 151. Assuming applications 159, 161 and 163 correspond to different tenants in the apartment building, the tenants corresponding to applications 159 and 163 need to reimburse the tenant that corresponds to application 161 for their respective usage of shared device 151.

SUMMARY OF THE INVENTION

A power sharing apparatus and method are disclosed. In one embodiment, a method of sharing power includes switchably coupling and decoupling each of a plurality of power sources to deliver at least a portion of power to a shared power supply. Each of the power sources corresponds to one of a plurality of applications. The method also includes adjusting the portion of power delivered by each one of the power sources to the shared power supply responsive to an amount of usage by the application corresponding to the respective power source. Additional features and benefits of the present invention will become apparent from the detailed description, figures and claims set forth below.

BRIEF DESCRIPTION OF THE DRAWINGS

The present invention is illustrated by way of example and not limitation in the accompanying figures.

FIG. 3D is a timing diagram illustrating still another embodiment of switching signals used to switch power sources to deliver power to the shared power supply in accordance with the teachings of the present invention.

FIG. 3E is a timing diagram illustrating yet another embodiment of switching signals used to switch power sources to deliver power to the shared power supply in accordance with the teachings of the present invention.

FIG. 3F is a timing diagram illustrating still another embodiment of switching signals used to switch power sources to deliver power to the shared power supply in accordance with the teachings of the present invention.

DETAILED DESCRIPTION

Figure 1A:
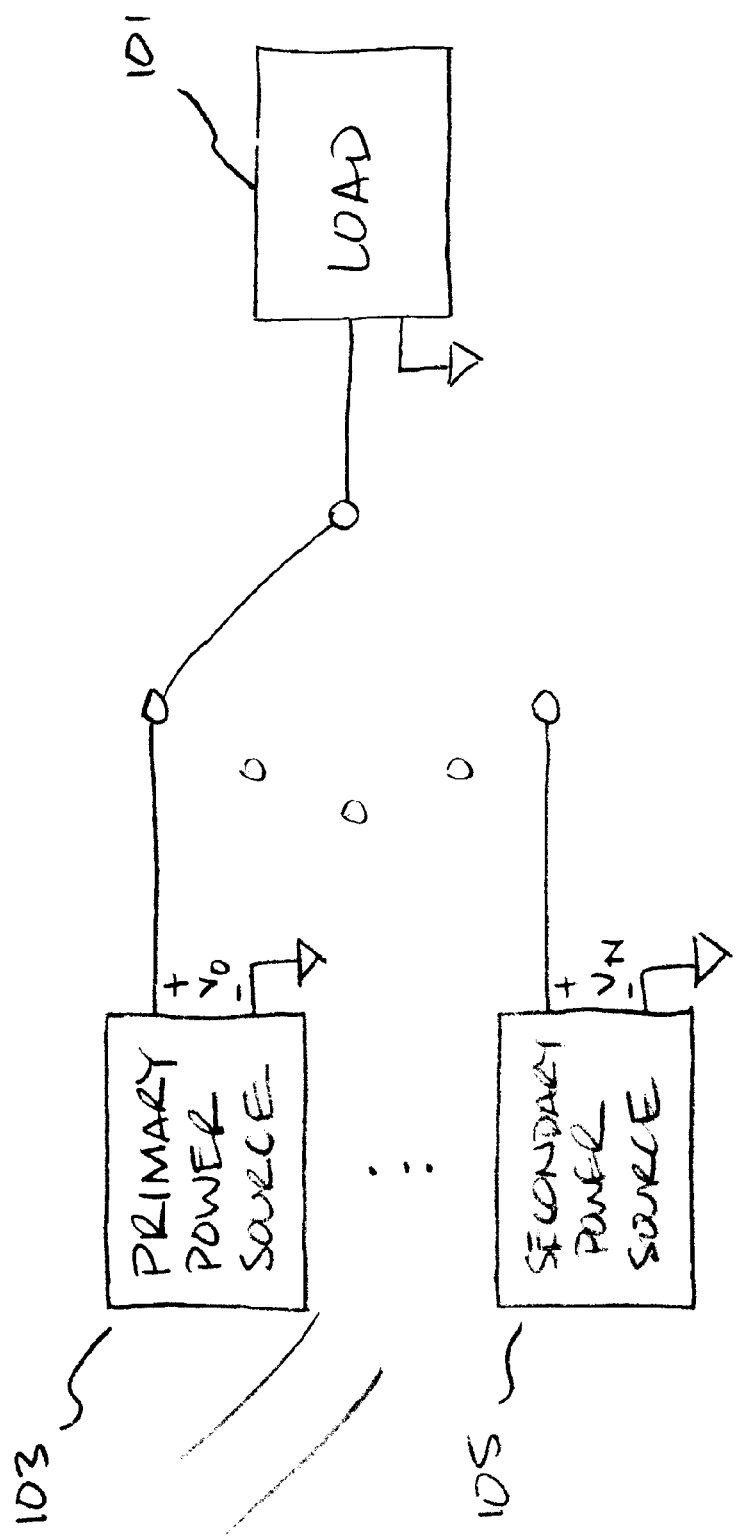
FIG. 1A is a diagram illustrating a present day arrangement of a plurality of redundant power sources available to supply to a load.
Figure 1B:
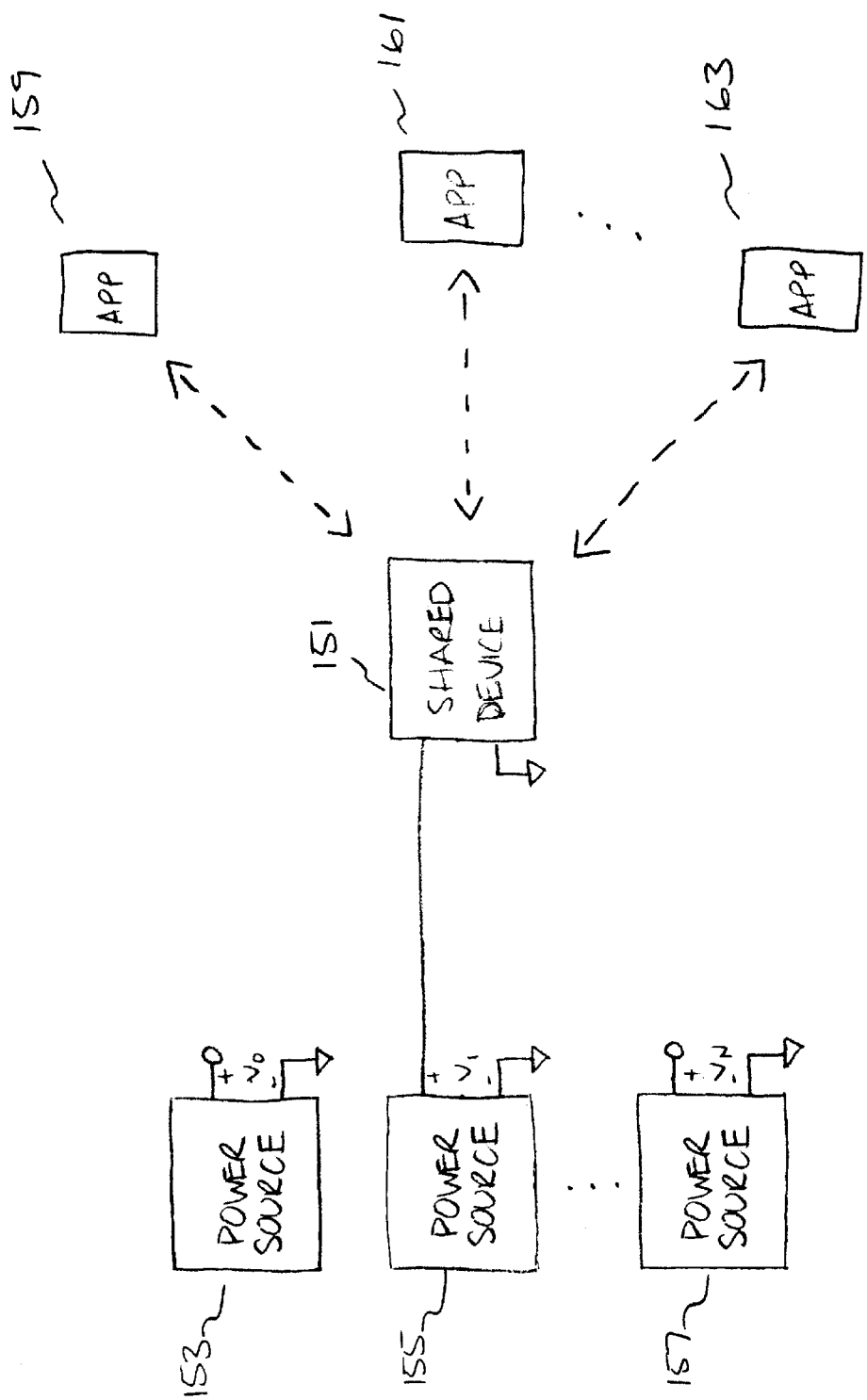
FIG. 1B is a diagram illustrating a present day arrangement of a plurality of applications sharing a device powered by the power source of a single application.

In one aspect of the present invention, methods and apparatuses for sharing power are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one aspect of the present invention, a power supply driving a loading device or devices draws power from a plurality of power sources by coupling to each source in turn for a length of time. The lengths of time of coupling may be set and/or varied in response to a variety of preset and measured parameters. These parameters may include, but are not limited to, the capability of each power source to supply power, the voltage or current or power available from each power source, the need to increase or decrease the voltage or current of the power supply's output to maintain output regulation, the nature of the loading of the application devices, etc. In one embodiment, the average duty cycle of coupling to the power sources determines the total power available from the power supply and may determine the regulated voltage or current output as well. In addition, the average duty cycle of coupling to each power source relative to the other power sources determines the relative power drawn from each power source.

In one example embodiment of the present invention, a device or devices that are shared by a plurality of different applications are supplied power from a shared power supply in accordance with the teachings of the present invention. For purposes of this disclosure, it is understood that a device may include an individual load or device or a plurality of loads or devices taken in combination that utilize power. In addition, it is understood that an application for purposes of this disclosure may refer to a user, to automated equipment, to a plurality of users or applications, to persons that use or share the device on a varying or consistent basis or the like. Applications in accordance with the teachings of the present invention may vary their function under preprogrammed specifications and/or in response to varying internal or external parameters, or to any changing conditions that result in changing the power drawn from a power supply.

The power that is delivered to the shared power supply is contributed equitably from a plurality of different power sources. Each one of the different power sources belongs or corresponds to one of the applications that shares the device. In one embodiment, the amount of power that is provided to the shared power supply from a particular power source is varied in accordance with the amount or level of usage by the application that corresponds to the particular power source. For example, if one particular application uses the shared device more than the other applications, the corresponding power source delivers more of the power to the shared power supply relative to other power sources. Thus, the power sources deliver power proportional to the level of usage of the applications in accordance with the teachings of the present invention. Indeed, if one particular application uses the shared device less than the other applications, the corresponding power source delivers less of the power to the shared power supply compared to others.

Figure 2:
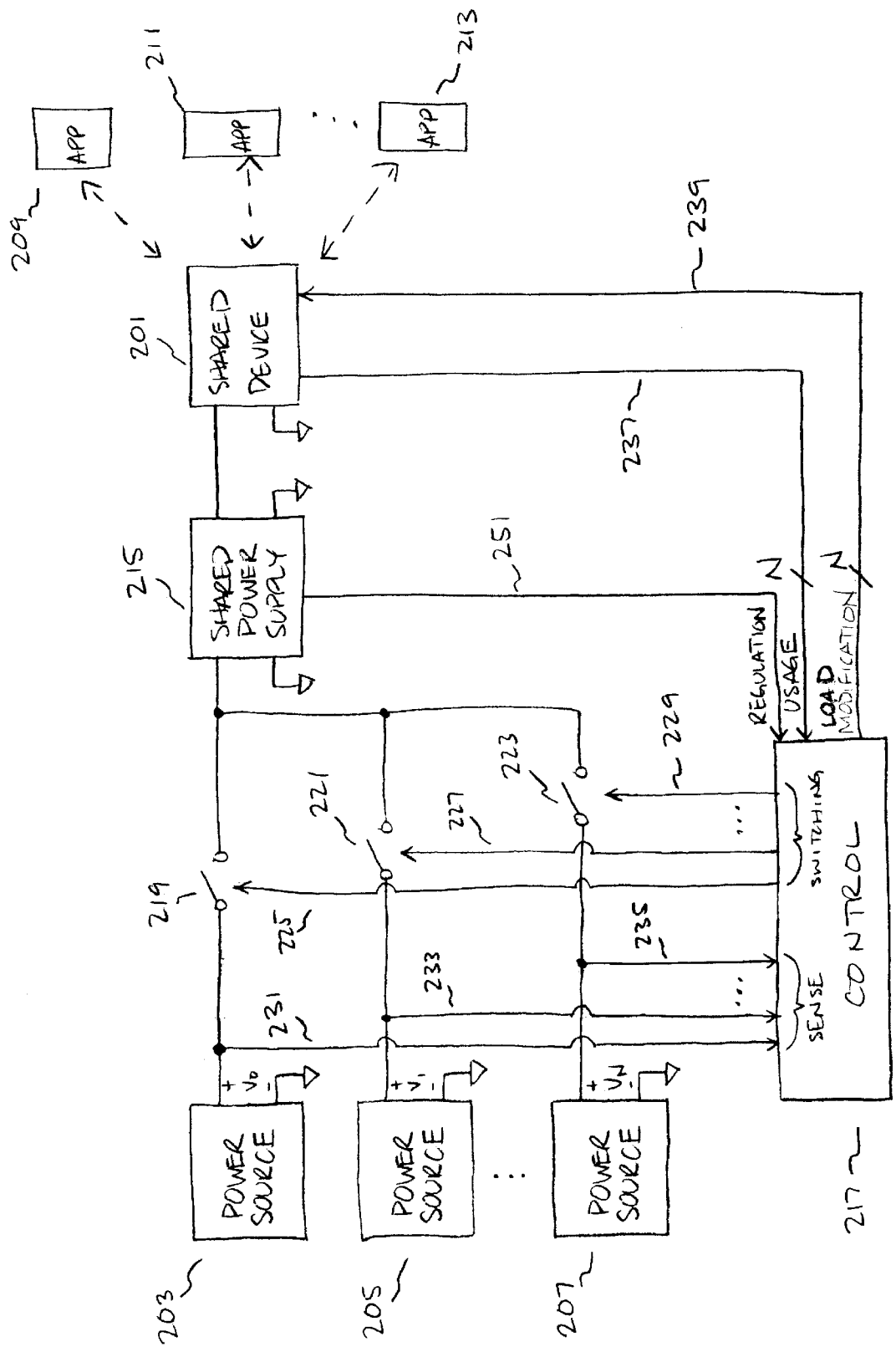
FIG. 2 is a diagram of one embodiment of a shared device powered by a shared power supply coupled to draw power from a plurality of power sources in accordance with the teachings of the present invention.

An example embodiment of the present invention is illustrated in FIG. 2. As shown, a plurality of N applications includes application 209, application 211 and application 213. Each application 209, 211 and 213 has a corresponding power source. In particular, application 209 has a power source 203, application 211 has a power source 205 and application 213 has a power source 207. In the example illustrated in FIG. 2, shared device 201 is shared by all the applications 209, 211 and 213.

It is appreciated that many embodiments of the present invention may be applicable to many different types of shared devices. For example, in one embodiment, it is contemplated that shared device 201 is a multi-line subscriber unit for use in a wireless local loop application. In other words, shared device 201 may be a telephone system for use by application 209, application 211 and application 213. In a multi-line subscriber unit, each application 209, 211 and 213 has a telephone. In a wireless local loop system, applications of the multi-line subscriber unit are connected to the central office through a wireless connection.

For explanation purposes only, many examples provided in this specification will be described in terms of shared device 201 including a multi-line subscriber unit shared by a plurality of applications and providing telephone communications. However, an incomplete list of other devices contemplated for shared device 201 might include one or more shared electrically powered items in a multi-tenant setting in a building, such as for example but not limited to an electric furnace, air conditioning, a water heater, a security gate, exercise equipment, a swimming pool heater, indoor or outdoor lighting, etc. In addition, many of the illustrations provided in this specification show a plurality of N equals three applications, power sources, switches, etc. It is appreciated of course that embodiments of the present invention are not limited to a plurality of three applications sharing power.

Referring back to the embodiment illustrated in FIG. 2, shared device 201 is powered by shared power supply 215. In one embodiment, shared power supply 215 is contemplated to include a known switched mode power supply to provide a regulated power output to shared device 201. As also shown in FIG. 2, power is delivered to shared power supply 215 from all power sources 203, 205 and 207 through switches 219, 221 and 223, respectively.

In one embodiment, control circuitry 217 is coupled to generate a plurality of switching signals 225, 227 and 229. As shown, switching signal 225 is coupled to turn switch 219 on and off. Switching signal 227 is coupled to turn switch 221 on and off and switching signal 229 is coupled to turn switch 223 on and off. Using switching signals 225, 227 and 229, control circuit 217 is able to control the amount of power delivered by each power source 203, 205 and 207 to shared power supply 215 by controlling the average duty cycle of each switching signal 225, 227 and 229. In one embodiment, the amount of power delivered by each power source 203, 205 and 207 is apportioned by control circuit 217 in an equitable manner based on the level of usage by each respective application. Indeed, FIG. 2 shows that in one embodiment, control circuit 217 is coupled to receive usage signals 237 from shared device 201, which indicate a level of usage by application 209, application 211 and application 213. In one embodiment, a regulation signal 251 is generated by shared power supply 215, which is received by control 217 to vary switching signals 231, 233 and 235 to provide regulated power to shared device 201.

To illustrate, assume for example that application 209, application 211 and application 213 represent tenants or neighbors in an apartment building and that shared device 201 is a multi-line subscriber unit providing telephone service to application 209, application 211 and application 213. In this example, one embodiment of power source 203 is contemplated as being an alternating current to direct current (AC to DC) converter plugged into the wall of the apartment of application 209. Similarly, one embodiment of power sources 205 and 207 are AC to DC converters plugged into the walls of the respective apartments of application 211 and application 213. It is contemplated that power sources 203, 205 and 207 can include other types of power sources included for example batteries, generators, or AC to DC converters having battery backup, etc. For example, power sources with battery backup help assure that service is maintained even if primary power is lost. Continuing with this example, shared power supply 215, switches 219, 221 and 223 and control circuit 217 could be installed in a utility room of the apartment building in which applications 209, 211 and 213 use shared device 201. It is noted that extended cables used for delivering power in accordance with the teachings of the present invention carry relatively low voltages. It is appreciated of course that the present invention is not limited to the example arrangement described above, which has been provided for explanation purposes.

As shown in FIG. 2, one embodiment of control circuit 217 generates a load modification signal or load modifications signals 239. For instance, in one embodiment, if a weak, improperly functioning or disconnected power source 203, 205 or 207 has been detected through one of the sense signals 231, 233 or 235 respectively, a load modification signal 239 is generated to disable, control or limit the shared device 201 from being used by the application corresponding to the problem function power source 203, 205 or 207. In one embodiment, load modification signal 239 is used to result in an adjustment of the amount of power drawn by each application 209, 211 or 213 or limit the service provided to each application 209, 211 or 213. By adjusting the services available to each application from shared device 201, the amount of power drawn by each application 209, 211 or 213 is adjusted. Therefore, in one embodiment, the amount of service available, if any, to each application 209, 211 or 213 from shared device 201 is responsive to the capability of each respective power source 203, 205 or 207 to provide power. In one embodiment, load modification signal 229 may be used to adjust the loading of the shared power supply by at least one of the applications 209, 211 or 213 in response to sense signals 231, 233 or 235 to adjust the amount of power drawn from shared power supply 215.

Figure 3A:
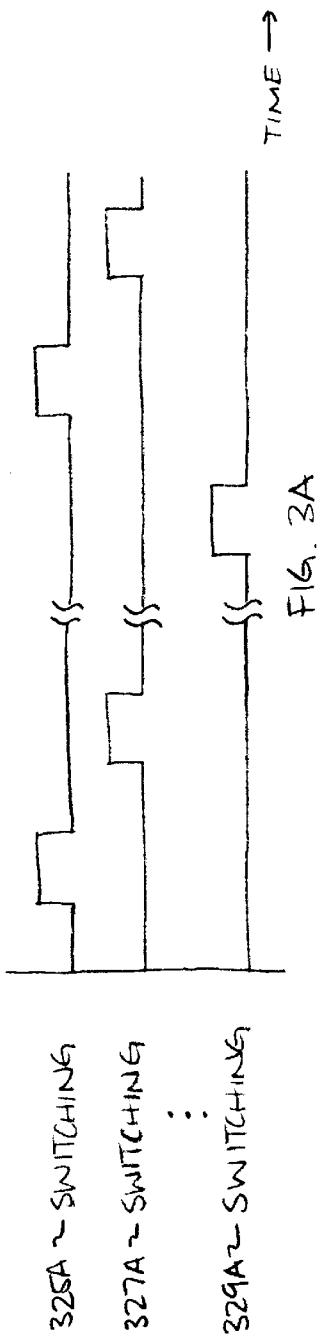
FIG. 3A is a timing diagram illustrating one embodiment of switching signals used to switch power sources to deliver power to the shared power supply in accordance with the teachings of the present invention.

Referring now to FIG. 2 and the timing diagram of FIG. 3A, switching signal 325A, switching signal 327A and switching signal 329A illustrate one example of how switches 219, 221 and 223 could be switched if all phones are idle or not in use. That is, if application 209, application 211 and application 213 do not use their phones, but the phones still consume some nominal power during standby, the timing diagram of FIG. 3A shows that each switch 219, 221 and 223 is turned on successively to switchably couple power source 203, 205 and 207 to deliver power to shared power supply 215. In the timing diagram shown in FIG. 3A, the amount of power delivered by each power source 203, 205 and 207 is apportioned equally since each application 209, 211 and 213 is using shared device 201 equally. It is also noted that isolation is provided between power sources 203, 205 and 207 because only one switch 219, 221 or 223 is ever on at a time. In the embodiment described in FIGS. 3A, 3B and 3C, the number of pulses is varied to apportion the load to power sources 203, 205 and 207. In one embodiment, the widths of the pulses may be varied to help maintain output regulation.

Figure 3B:
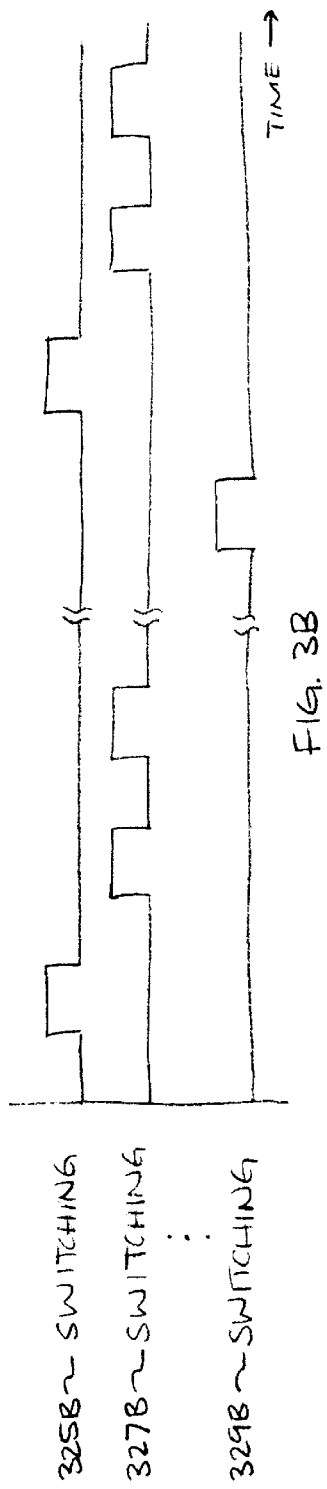
FIG. 3B is a timing diagram illustrating another embodiment of switching signals used to switch power sources to deliver power to the shared power supply in accordance with the teachings of the present invention.

Referring now to FIG. 2 and the timing diagram of FIG. 3B, it is assumed that application 211 is now using the telephone (i.e. application 211 is using shared device 201) while application 209 and application 213 are not using the telephone. In one embodiment, the use of shared device 201 by application 211 is detected by control circuit 217 through usage signals 237. For example, usage signals 237 in one embodiment could indicate that application 211 has picked up the handset of the telephone. As shown in FIG. 3B, switching signal 327B is switched on two pulses for every one pulse of switching signal 325B and switching signal 329B. As a result, power source 205 is coupled to deliver power to shared power supply 215 two times for every one time that power source 203 and every one time that power source 207 deliver power to shared power supply 215. Therefore, power source 205 of application 211 is switched at an average duty cycle greater than the average duty cycle that power sources 203 or 205 are switched in response to greater usage by application 211. Accordingly, power source delivers more power to shared power supply 215 when application 211 is using the telephone and application 209 and application 213 are not using the telephone.

Figure 3C:
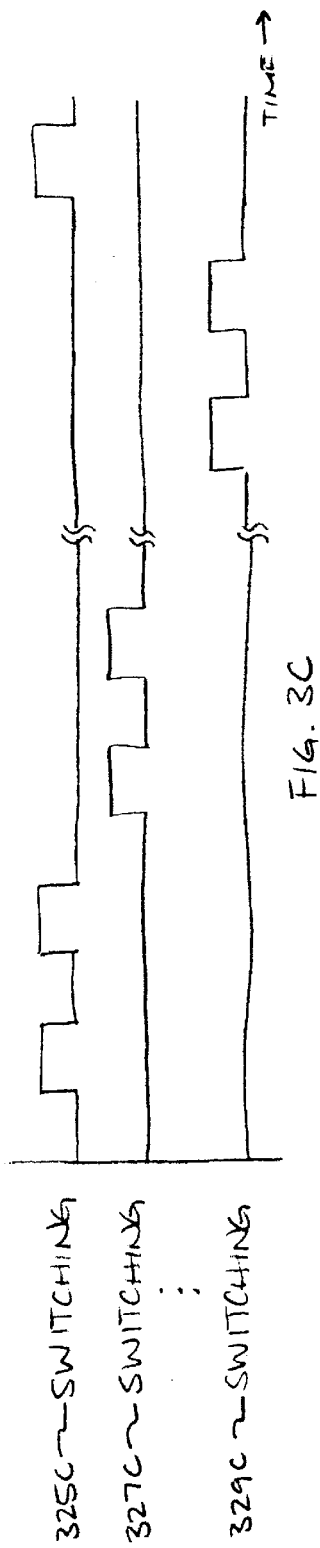
FIG. 3C is a timing diagram illustrating yet another embodiment of switching signals used to switch power sources to deliver power to the shared power supply in accordance with the teachings of the present invention.

Referring now to FIG. 2 and the timing diagram of FIG. 3C, it is assumed now that all applications are using the telephone (i.e. application 209, application 211 and application 213 are all now using shared device 201). In one embodiment, the use of shared device 201 by application 209, application 211 and application 213 is detected by control circuit 217 through usage signals 237. As shown in FIG. 3C, switching signal 325C, switching signal 327C and switching signal 327C are all switched on two pulses for every cycle. For purposes of this disclosure, a cycle in this context is the sequence of addressing all switches 219, 221 and 223 such that all power sources 203, 205 and 207 are switched to deliver power to shared power supply 215 for an equitable amount of time based on usage. Indeed, in one embodiment, switches 219, 221 and 223 are switched sequentially in a cyclical manner. As a result, all of the power sources 205, 207 and 209 are coupled to deliver power to shared power supply 215 just as often as all of the other power sources. Therefore, the amount of power delivered by each power source 203, 205 and 207 is apportioned equally since each application 209, 211 and 213 is using shared device 201 equally.

In another embodiment, the relative widths of the pulses in switching signals 231, 233 and 235 may be varied to apportion the load of the power sources 203, 205 and 207. Examples of this embodiment of the present invention are illustrated in the timing diagrams shown in FIGS. 3D, 3E and 3F. In particular, FIG. 3D shows example switching waveforms 325D, 327D and 329D, which correspond to switching signals 231, 233 and 235 of FIG. 2 when all telephones are idle. In this illustration, all applications 209, 211 and 213 are drawing the same amount of power, and therefore, the relative pulse widths of switching waveforms 325D, 327D and 329D are substantially equal.

FIG. 3E shows example switching waveforms 325E, 327E and 329E, which correspond to switching signals 231, 233 and 235 of FIG. 2, if for example the telephone of application 161 in FIG. 2 is used while the telephones of applications 159 and 163 are not used. As shown, the pulses in switching waveform 327E are wider than the pulses in switching waveforms 325E and 329E FIG. 3F shows example switching waveforms 325F, 327F and 329F, which correspond to switching signals 231, 233 and 235 of FIG. 2, if for example the telephones of all applications 159, 161 and 163 in FIG. 2 are used. As shown, the pulses in switching waveforms 325E, 327E and 329E are all wider than switching waveforms 325E, 327E and 329E. However, switching waveforms 325E, 327E and 329E are substantially equal in width since the telephones of all applications 159, 161 and 163 are assumed to draw substantially the same amount of power.

In an example embodiment of the present invention, control circuit 217 of FIG. 2 is also coupled to receive sense signals from the outputs of all the power sources. For instance, control circuit 217 is coupled to receive a sense signal 231 from the output of power source 203, a sense signal 233 from the output of power source 205 and a sense signal 235 from the output of power source 207. In one embodiment, a power source 203, 205 or 207 may be able to provide less power than other sources or than its maximum supply capability, either through design or failure. Reduction of available power may occur through discharge in the case of a battery, fuel cell, reactor, or the like. In this embodiment, the control circuit 217 senses the ability of each power source to supply power, for example by sensing the voltage from the source. The control circuit in one embodiment adjusts the switching signals 231, 233 and 235 accordingly to cause the respective power sources 203, 205 and 207 to deliver an amount of power commensurate with its supply capability.

Furthermore, in one embodiment, a threshold, which may be different for different power sources, may be employed. If any of the output voltages $V_0$, $V_1$ and $V_N$ fall below the corresponding threshold voltage, then the particular power supply is unable to adequately deliver power to shared power supply 215. If so, control circuit 217 in one embodiment will temporarily disable the switch corresponding to the defective power supply from being able to be switched on.

For example, assume that control circuit 217 detects through sense signal 231 that $V_O$ has fallen below a threshold voltage and that power source 203 is therefore not operating properly. In this situation, control circuit 217 will disable switch 219 from being closed such that shared power supply 215 will no longer be switchably coupled to power source 203 to receive power. In one embodiment, control circuit 217 will re-enable switch 219 to close after sense signal 231 indicates that $V_O$ has risen back to a level above the threshold voltage indicating that power source 203 is operating properly again. In one embodiment, the threshold value used is a hysteretic value such that operation of control circuit 217 will not be unstable due to race conditions that might result from low supply voltage situations.

Figure 4:
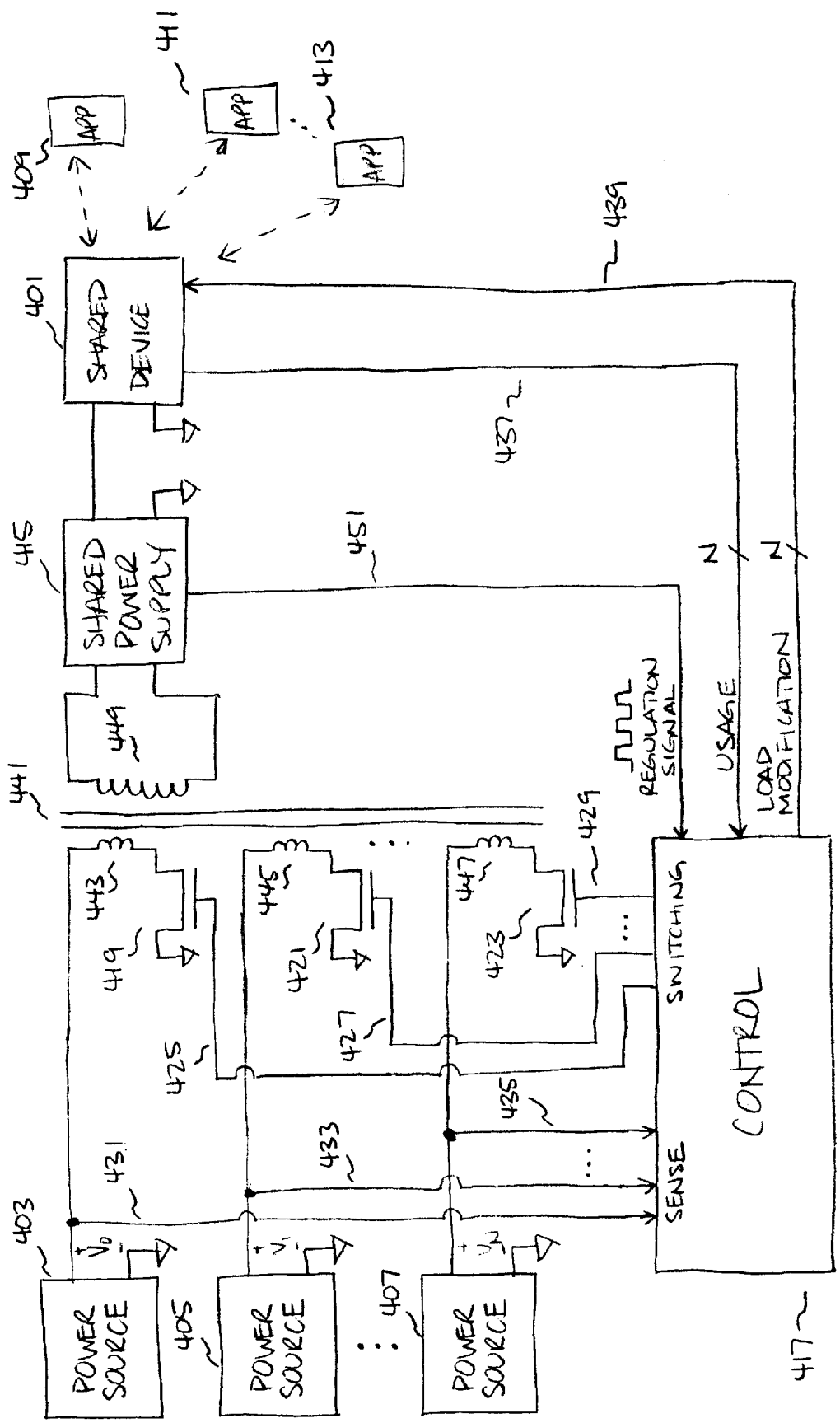
FIG. 4 is a diagram of another embodiment of a shared device powered by a shared power supply coupled to be delivered power from a plurality of power sources in accordance with the teachings of the present invention.

FIG. 4 is a block diagram illustrating another embodiment of an arrangement in accordance with the teachings of the present invention in which a plurality of N applications including application 409, application 411 and application 413 all use shared device 401. Each application has 409, 411 and 413 has a corresponding power source 403, 405 and 407, respectively. Power sources 403, 405 and 407 are used to deliver power to a shared power supply 415 in an equitable manner. Power supply 415 is then used to power shared device 401.

In the embodiment depicted in FIG. 4, shared power supply 415 is contemplated to include a known switched mode power supply. As is known to those skilled in the art, switched mode power supplies provide a regulated power supply output by using, among other things, a switching or regulation signal 451 to control the switching of a power switch (not shown) internal to the switched mode power supply. In one embodiment, this regulation signal 451 is instead coupled to be received by control circuit 417. In one embodiment, the regulation signal 451 is used to generate the switching signals 423, 425 and 427.

As shown in the embodiment of FIG. 4, shared power supply 415 is coupled to be delivered power through a secondary winding 449 of a transformer or energy transfer element 441. In the depicted embodiment, energy transfer element 441 includes a plurality of N primary windings 443, 445 and 447. Each of the primary windings 443, 445 and 447 corresponds to one of the power sources 403, 405 and 407, respectively. In one embodiment, primary windings 443, 445 and 447 and secondary winding 449 provide electrical isolation for power sources 403, 405 and 407 and shared power supply 415. In addition, it is appreciated that energy transfer element 441 helps provide ground and noise isolation as well as voltage transformation and translation functions in accordance with the teachings of the present invention.

In one embodiment, switch 419 is coupled in series with primary winding 443 and power source 403 to switchably couple the delivery of power to primary winding 443 from power source 403. Switch 421 is coupled in series with primary winding 445 and power source 405 to switchably couple the delivery of power to primary winding 445 from power source 405. Switch 423 is coupled in series with primary winding 447 and power source 407 to switchably couple the delivery of power to primary winding 443 from power source 403.

In one embodiment, switches 419, 421 and 423 are implemented with a transistor such as for example a metal oxide semiconductor field effect (MOSFET) transistor, a bipolar junction transistor (BJT) or the like. In addition, is noted that switches 419, 421 and 423 are contemplated to be series coupled on other side of primary windings 443, 445 and 447, respectively.

As shown, switches 419, 421 and 423 are switched responsive to switching signals 425, 427 and 429, which are generated by control circuit 417. Using switching signals 425, 427 and 429, control circuit 417 is able to control the amount of power delivered by each power source 403, 405 and 407 to shared power supply 415 through energy transfer element 441. Thus, the amount of power delivered by each power source 403, 405 and 407 is apportioned by control circuit 417 in an equitable manner based on the level of usage by each respective application, as indicated usage signals 437 from shared device 401.

In one embodiment, it is appreciated that the switching signals 425, 427 and 429 generated by control circuit 417 are similar to the switching signals described in connection with the various embodiments of FIGS. 2, 3A, 3B, 3C, 3D, 3E and 3F. For example, using the multi-line subscriber unit example discussed earlier for shared device 401, if none of application 409, application 411 and application 413 use the telephone, switching signals 425, 427 and 429 are in one embodiment similar to the switching signals illustrated in FIG. 3A or 3D. If application 411 uses the phone while application 409 and application 413 do not use the phone, switching signals 425, 427 and 429 are in one embodiment similar to the switching signals illustrated in FIG. 3B or 3E. If all of application 409, application 411 and application 413 use the phone, switching signals 425, 427 and 429 are in one embodiment similar to the switching signals illustrated in FIG. 3C or 3F.

It is noted that the pattern of the switching signals illustrated in FIGS. 3A, 3B, 3C, 3D, 3E and 3F are provided for explanation purposes and that other switching signal patterns could be generated by control circuit 417 and 217 in accordance with the teachings of the present invention to equitably distribute the burden of delivering power from the individual power sources to the shared power supply based on the usage of the particular applications. For example, other patterns of switching signals could include more pulses per cycle for each switch such that increased resolution is achieved when apportioning power delivery covering all combinations of idle phone usage, active calling, multiple load levels, continuously varying load levels, etc. In one embodiment, control circuit 417 may generate the patterns used for switching signals 425, 427 and 429 with the use of a processor, either local or remote, by state machines, fuzzy logic, conventional logic, lookup tables or the like to adjust the average duty cycles of switching signals 425, 427 and 429 in response to usage signals 437.

As shown in FIG. 4, control circuit 417 is also coupled to receive sense signals 431, 433 and 455 from the outputs of all the power sources 403, 405 and 407, respectively. Using sense signals 431, 433 and 435, control circuit 417 is able to detect the ability of each power source to deliver power to shared power supply 415. For example, if power sources 403, 405 and 407 are all functioning properly, the output voltages $V_O$, $V_1$ and $V_N$, respectively, will all be above a threshold voltage. However, if any of the output voltages $V_O$, $V_1$ and $V_N$ fall, then the particular power supply is either less able or unable to adequately deliver power to shared power supply 415. If the power supply is unable to supply power, then control circuit 417 in one embodiment will disable the switch corresponding to the defective power supply from being able to be switched on until the voltage at the output of the power supply rises back above a threshold voltage. In one embodiment, the threshold value is hysteretic.

In one embodiment, if a weak or improperly functioning power source 403, 405 or 407 has been detected through one of the sense signals 431, 433 or 435 respectively, a load modification signal 439 is generated to disable, control or limit the shared device 401 from being used by the application corresponding to the problem function power source 403, 405 or 407. In one embodiment, load modification signal 439 is used to result in an adjustment of the amount of power drawn by each application 409, 411 or 413 or limit the service provided to each application 409, 411 or 413. By adjusting the services available to each application from shared device 401, the amount of power drawn by each application 409, 411 or 413 is adjusted. Therefore, in one embodiment, the amount of service available, if any, to each application 409, 411 or 413 from shared device 401 is responsive to the capability of each respective power source 403, 405 or 407 to provide power. In one embodiment, load modification signal 429 may be used to adjust the loading of the shared power supply by at least one of the applications 409, 411 or 413 in response to sense signals 431, 433 or 435 to adjust the amount of power drawn from shared power supply 415.

Figure 5:
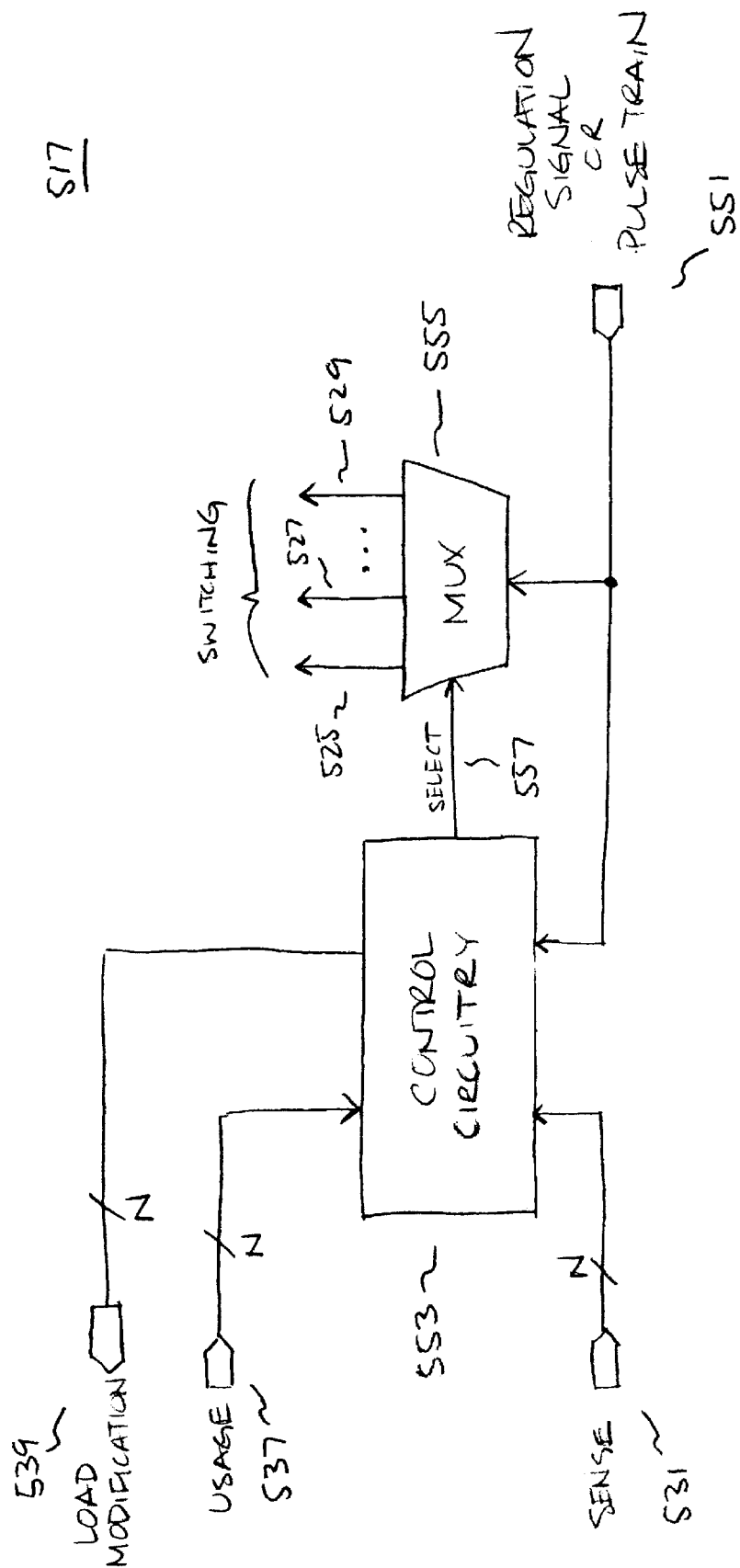
FIG. 5 is a diagram of one embodiment of a control circuit used to control the switching of a plurality of power sources to deliver power to a shared power supply in accordance with the teachings of the present invention.

FIG. 5 is a block diagram illustrating one embodiment of a control circuit 517 in accordance with the teachings of the present invention. In one embodiment, control circuit 517 may be used in place of control circuit 417 of FIG. 4. As shown in the embodiment depicted in FIG. 5, control circuit 517 includes a 1 to N multiplexor 555. In one embodiment, multiplexor 555 includes a plurality of N outputs 525, 527 and 529 and an input 551. In one embodiment, input 551 is coupled to receive an oscillating signal such as for example a regulation signal from a switched mode power supply or an oscillating signal such as for example a pulse train or the like.

In one embodiment, if a weak or improperly functioning power source 403, 405 or 407 has been detected through one of the sense signals 431, 433 or 435 respectively, a load modification signal 439 is generated to disable, control or limit the shared device 401 from being used by the application corresponding to the problem function power source 403, 405 or 407. In one embodiment, load modification signal 439 is used to result in an adjustment of the amount of power drawn by each application 409, 411 or 413 or limit the service provided to each application 409, 411 or 413. By adjusting the services available to each application from shared device 401, the amount of power drawn by each application 409, 411 or 413 is adjusted. Therefore, in one embodiment, the amount of service available, if any, to each application 409, 411 or 413 from shared device 401 is responsive to the capability of each respective power source 403, 405 or 407 to provide power. In one embodiment, load modification signal 439 may be used to adjust the loading of the shared power supply by at least one of the applications 409, 411 or 413 in response to sense signals 431, 433 or 435 to adjust the amount of power drawn from shared power supply 415.

Referring back to the embodiment depicted in FIG. 5, multiplexor control circuit is also coupled to receive usage signals 537 and sense signals 531. In one embodiment, select signal 557 is generated to control multiplexor 555 responsive to the regulation signal or pulse train received at input 551, usage signals 537 and sense signals 531 in accordance with the teachings of the present invention.

In one embodiment, multiplexor control circuit 553 generates load modification signals 539 responsive to sense signals 531 in accordance with the teachings of the present invention. In one embodiment, load modification signals 539 correspond to load modification signals 439 of FIG. 4 to disable, control or limit the service available to an application with a weak or improperly functioning power source as detected by sense signals 531 from using a shared device powered in accordance with the teachings of the present invention. In so doing, one embodiment of the present invention therefore controls or limits the amount of power drawn in response to each application with the load modification signals 539 responsive to the sense signals 531. In one embodiment, the load modification signal signals 539 are used to adjust the loading by an application or applications on the shared power supply output, thereby adjusting the power drawn from the shared power supply in response to the capability to supply power of each of the power sources.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method of sharing power, comprising:
   switchably coupling and decoupling each of a plurality of power sources to provide at least a portion of power to a shared power supply, each of the power sources corresponding to one of a plurality of applications; and
   adjusting the portion of power delivered by each one of the power sources to the shared power supply responsive to an amount of usage by the application corresponding to the respective power source.

2. The method of sharing power described in claim 1 wherein adjusting the portion of power delivered by each one of the power sources to the shared power supply comprises:
   increasing the portion of power delivered by one of the power sources to the shared power supply responsive to an increase in usage of a shared device coupled to be powered by the shared power supply by the application corresponding to the respective power source; and
   decreasing the portion of power delivered by one of the power sources to the shared power supply responsive to a decrease in usage by the application corresponding to the respective power source.

3. The method of sharing power described in claim 1 further comprising:
   sensing a capability to supply power of each of the power sources; and
   disabling power sources from being switchably coupled and decoupled to provide power to the shared power supply if the respective capability to supply power of the respective power sources are below a threshold value.

4. The method of sharing power described in claim 3 wherein sensing the capability to supply power of each of the power sources comprises sensing an output voltage of each one of the power sources.

5. The method of sharing power described in claim 3 further comprising adjusting further the portion of power delivered by each one of the power sources to the shared power supply responsive to the respective sensed capability to supply power of each one of the power sources.

6. The method of sharing power described in claim 3 further comprising controlling an amount of power drawn from the shared power supply responsive to the sensed capability to supply power of each respective one of the power sources.

7. The method of sharing power described in claim 3 further comprising selectively limiting usage of a shared device coupled to be powered by the shared power supply by the respective applications corresponding to the respective power sources having sensed capability to supply power below the threshold value.

8. The method of sharing power described in claim 1 further comprising electrically isolating the plurality of power sources and the shared power supply with an energy transfer element having a plurality of primary windings and a secondary winding.

9. The method of sharing power described in claim 1 further comprising regulating an output of the shared power supply by generating a regulation signal with a switched mode power supply included in the shared power supply.

10. The method of sharing power described in claim 1 further comprising regulating an output of the shared power supply by adjusting the portion of power delivered by each one of the power sources to the shared power supply responsive to the output of the shared power supply.

11. The method of sharing power described in claim 9 further comprising multiplexing the regulation signal to switchably couple and decouple each of the plurality of power sources to provide said at least portion of power to the shared power supply.

12. An apparatus, comprising:
 a plurality of power sources;
 a plurality of switches, each one of the switches coupled to a corresponding one of the power sources;
 a shared power supply switchably coupled to be delivered power by the plurality of power sources through the plurality of switches; and
 a control circuit coupled to each one of the switches, the control circuit coupled to receive a plurality of usage signals, each one of the usage signals corresponding to one of the power sources, the control circuit to switch each one of the switches responsive to the plurality of usage signals.

13. The apparatus of claim 12 wherein the control circuit is further coupled to receive a plurality of sense signals from each one of the sources, each one of the sense signals to indicate a capability to supply power of one of the power sources, the control circuit to switch each one of the switches responsive to the plurality of sense signals.

14. The apparatus of claim 13 wherein the control circuit is further coupled to generate a load modification signal, the load modification signal responsive to the plurality of sense signals.

15. The apparatus of claim 14 further comprising a shared device coupled to be powered by the shared power supply, the shared device coupled to receive the load modification signal, a service provided by the shared device coupled to be limited responsive to the load modification signal.

16. The apparatus of claim 12 further comprising an energy transfer element having a plurality of primary windings and a secondary winding, the secondary winding coupled to the shared power supply, each one of the primary windings corresponding to one of the power sources, each one of the switches coupled in series with a corresponding one of the primary windings to switchably couple the corresponding primary winding to receive power from the corresponding power source in response to control circuit.

17. The apparatus of claim 12 wherein the shared power supply includes a switched mode power supply.

18. The apparatus of claim 17 wherein the switched mode power supply is coupled to generate a regulation signal, the control circuit coupled to receive the regulation signal and switch the plurality of switches responsive to the regulation signal.

19. The apparatus of claim 12 wherein the control circuit comprises:
 a multiplexor coupled to receive a pulse train signal, the multiplexor to selectively couple the pulse train to each of the switches in response to a select signal; and
 a multiplexor control circuit coupled to receive the usage signals and the pulse train signal, the multiplexor control circuit coupled to generate the select signal responsive to the usage signals and the pulse train signal.

20. The apparatus of claim 19 wherein the pulse train signal is a regulation signal generated by a switched mode power supply included in the shared power supply.

21. An apparatus, comprising:
 a plurality of first means for providing power, each one of the plurality of first means corresponding to one of a plurality of applications;
 second means for supplying power to a device to be used by the plurality of applications;
 third means for powering the second means with the plurality of first means; and
 fourth means for apportioning an amount of power supplied by each one of the plurality of first means to the second means responsive to an amount of usage by each respective one of the plurality of applications.

22. The apparatus of claim 21 further comprising fifth means for sensing a capability to supply power of each one of the plurality of first means, the fourth means for apportioning the power supplied by each one of the plurality of first means to the second means further responsive to the fifth means.

23. The apparatus of claim 21 further comprising sixth means for selectively disabling the device from being used by a particular one of the plurality of applications responsive to the fifth means.

24. The apparatus of claim 21 wherein the second means includes means for regulating a power supply output of the second means, the means for regulating the power supply output generating a regulation signal.

25. The apparatus of claim 24 wherein the fourth means is responsive to the regulation signal.

* * * * *